United States Patent
Morrow et al.

(10) Patent No.: US 7,357,203 B2
(45) Date of Patent: Apr. 15, 2008

(54) SELF-CONTAINED AXLE MODULE

(75) Inventors: Jon J. Morrow, Neenah, WI (US); Eric Braun, Oshkosh, WI (US); Nader Nasr, Neenah, WI (US); Martin Schimke, Redgranite, WI (US); Christopher K. Yakes, Oshkosh, WI (US); Donald H. Verhoff, Oshkosh, WI (US); Gary Schmidel, Oshkosh, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 284 days.

(21) Appl. No.: 10/952,540

(22) Filed: Sep. 28, 2004

(65) Prior Publication Data

US 2006/0065451 A1    Mar. 30, 2006

(51) Int. Cl.
    *B60K 1/00* (2006.01)
(52) U.S. Cl. .................................... 180/65.1
(58) Field of Classification Search ............ 180/65.1, 180/65.2, 65.3, 65.4, 65.5, 65.6, 69.1, 69.6; 296/38
    See application file for complete search history.

(56) References Cited

U.S. PATENT DOCUMENTS

| | | | | |
|---|---|---|---|---|
| 896,208 A | * | 8/1908 | Hoffman | 180/63 |
| 1,223,495 A | * | 4/1917 | Kelley | 180/57 |
| 2,731,099 A | | 1/1956 | Schroeder | |
| 3,826,327 A | * | 7/1974 | Stover | 180/69.1 |
| 4,335,429 A | * | 6/1982 | Kawakatsu | 701/102 |
| 5,538,274 A | | 7/1996 | Schmitz et al. | |
| 5,558,588 A | | 9/1996 | Schmidt | |
| 5,562,178 A | | 10/1996 | Worden et al. | |
| 5,669,842 A | | 9/1997 | Schmidt | |
| 5,755,456 A | | 5/1998 | Blažek et al. | |
| 5,808,427 A | | 9/1998 | Worden et al. | |
| 5,925,993 A | | 7/1999 | Lansberry | |

(Continued)

FOREIGN PATENT DOCUMENTS

| | | |
|---|---|---|
| EP | 1 229 636 A2 | 8/2002 |
| EP | 1 340 643 A2 | 9/2003 |
| FR | 2 851 621 A1 | 8/2004 |

OTHER PUBLICATIONS

PCT International Search Report based on International Application No. PCT/US2005/035007, date of mailing of the International Search Report Mar. 22, 2006 (2 pgs.).

*Primary Examiner*—Frank Vanaman
(74) *Attorney, Agent, or Firm*—Foley & Lardner LLP

(57) ABSTRACT

A self-contained axle module for a vehicle. The vehicle includes a support structure, a source for electric power, a source of cooling medium, and a vehicle control device. The self-contained axle includes a first side plate removably coupled to the support structure. A second side plate removably coupled to the support structure. A housing coupled to the first and second side plate. An electric motor coupled to the housing and the source for electric power. A motor drive controller unit coupled to the electric motor and to the vehicle control device to communicate signals to the vehicle control device such that one of the speed and torque of the electric motor is controlled based upon the signals. A gear train is mounted in the housing and coupled to the electric motor and an output shaft, wherein, the self-contained axle module can be selectively coupled and decoupled from the support structure.

14 Claims, 4 Drawing Sheets

U.S. PATENT DOCUMENTS

| | | | |
|---|---|---|---|
| 6,062,579 A | 5/2000 | Fortier | |
| 6,105,984 A | 8/2000 | Schmitz et al. | |
| 6,148,940 A * | 11/2000 | Hokanson et al. | 180/65.5 |
| 6,398,685 B1 | 6/2002 | Wachauer et al. | |
| 6,431,298 B1 | 8/2002 | Ruppert, Jr. et al. | |
| 6,491,123 B1 | 12/2002 | Pasquini et al. | |
| 6,516,907 B2 * | 2/2003 | Robinson | 180/69.1 |
| 6,516,914 B1 | 2/2003 | Andersen et al. | |
| 6,533,696 B1 * | 3/2003 | Takenaka et al. | 475/150 |
| 6,561,718 B1 | 5/2003 | Archer et al. | |
| 6,651,762 B1 * | 11/2003 | Hokanson et al. | 180/65.5 |
| 6,692,395 B2 | 2/2004 | Rodeghiero et al. | |
| 6,708,788 B2 | 3/2004 | Kuwayama | |
| 6,757,597 B2 | 6/2004 | Yakes et al. | |
| 6,843,750 B1 | 1/2005 | Bennett | |
| 6,899,190 B2 | 5/2005 | Bordini | |
| 6,904,987 B2 | 6/2005 | Haas et al. | |
| 6,935,990 B2 | 8/2005 | Kim | |
| 6,978,853 B2 | 12/2005 | Bennett | |
| 7,028,583 B2 | 4/2006 | Bennett | |
| 7,104,920 B2 | 9/2006 | Beaty et al. | |
| 7,115,057 B2 | 10/2006 | House | |
| 7,134,517 B1 | 11/2006 | Kaiser et al. | |
| 2002/0092687 A1 | 7/2002 | Forster | |
| 2002/0103580 A1 * | 8/2002 | Yakes et al. | 701/22 |
| 2003/0159865 A1 | 8/2003 | Schmidt | |
| 2003/0205422 A1 | 11/2003 | Morrow et al. | |
| 2004/0163893 A1 | 8/2004 | Langen | |

* cited by examiner

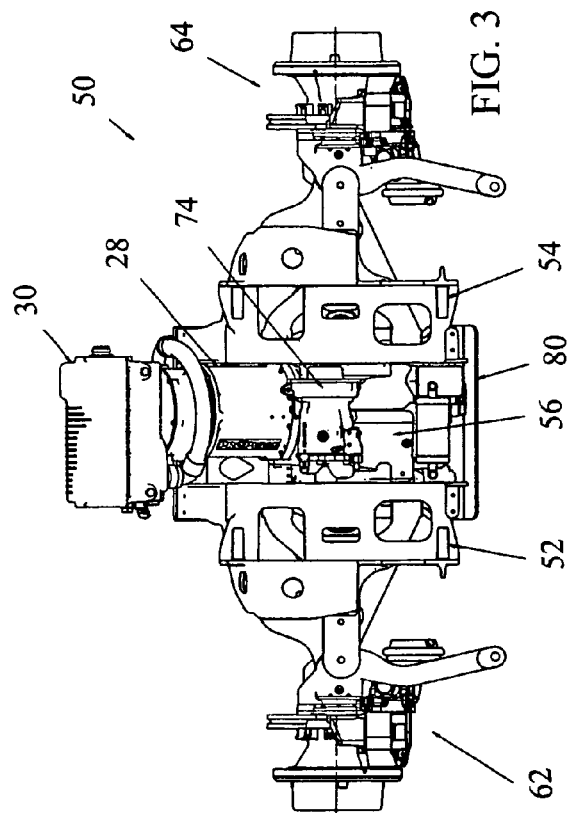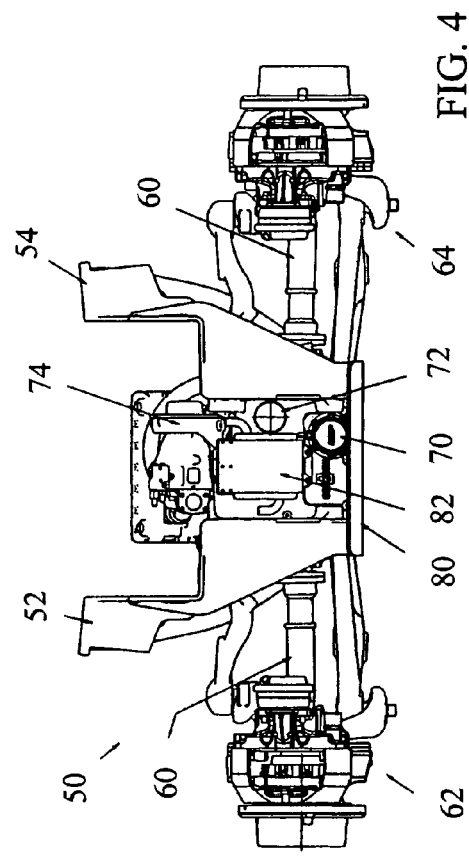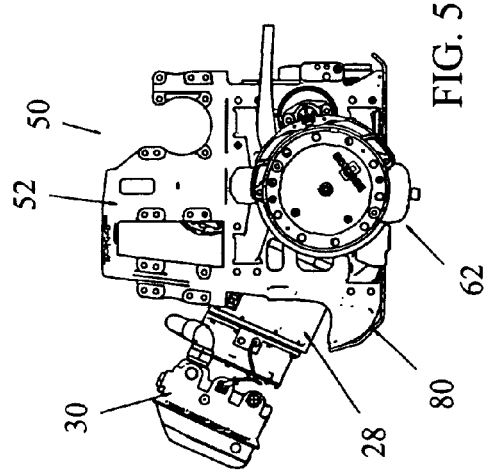

SELF-CONTAINED AXLE MODULE

FIELD

The present invention relates generally to hybrid electric vehicles, and more particularly to a self-contained axle module for an electric vehicle.

BACKGROUND

In a conventional electric vehicle, a prime mover such as a diesel engine, is used to drive an electric generator or alternator which supplies electric current to a plurality of electric motors. The electric motors typically are coupled to wheel sets, in line, on the vehicle. The vehicles that utilize this type of hybrid electric motor are typically railroad locomotives.

The prime mover drives the generator/alternator that typically produces an AC current that is then fully rectified with resulting DC current and voltage being distributed to current converters coupled to the electric motors. Such systems are highly integrated with each of the components typically designed and manufactured to operate with the other components in the overall system. In other words, "off the shelf" components are not readily adaptable for use in the initial design or ongoing maintenance of such vehicles. Further, such vehicles have multiple components associated with the change of AC to DC to AC power. Maintenance of such systems is expensive since specific components must be used.

In the use of hybrid drives for such electric vehicles, it is often necessary to add support systems such as pressurized lubrication and supplemental cooling for the motors and other components. Typically, these systems are centrally mounted on the vehicle and require the routing of specialized, pressurized, conduits to move the oil and coolant medium to specific points around the vehicle. Such additional equipment in conduit routings typically take up space that could be utilized for other purposes, such as cargo space. Such arrangements also are not cost effective since additional materials, i.e., conduits, pumps, filters, are required.

Thus there is a need for a self contained axle module for an electric vehicle that includes lubrication pump, filter, heat exchanger integrated into a single module. There is a further need for a self-contained axle module for a hybrid electric vehicle that is easy to replace and repair, particularly in the field. There is also a need for an electric vehicle that includes a self-contained axle module.

SUMMARY OF THE INVENTION

There is provided a self-contained axle module for a vehicle. The vehicle includes a support structure, a source for electric power, a source of cooling medium, and a vehicle control device. The self-contained axle includes a first side plate removably coupled to the support structure. A second side plate removably coupled to the support structure. A housing coupled to the first and second side plate. An electric motor coupled to the housing and the source for electric power. A motor drive controller unit coupled to the electric motor and to the vehicle control device to communicate signals to the vehicle control device such that one of the speed and torque of the electric motor is controlled based upon the signals. A gear train is mounted in the housing and coupled to the electric motor and an output shaft, wherein, the self-contained axle module can be selectively coupled and decoupled from the support structure. The self-contained axle module can include a first wheel end assembly coupled to the housing in the output shaft and a second wheel end assembly coupled to the housing and the output shaft. Another embodiment of the self-contained axle module includes an oil pump mounted inside the housing and immersed in oil. A further embodiment of a self-contained axle module includes a power take off apparatus mounted on the housing and coupled to the gear train and a tool.

There is also provided a vehicle comprising a vehicle support structure with a principle power unit supported by the structure. The principle power unit is not a battery. An electric AC power bus including at least two phase conductors is coupled to the principle power unit. A power storage unit is coupled to the AC power bus. A pair of self-contained axle modules are coupled to the vehicle support structure. A vehicle controller is coupled to each self-contained axle module and the AC power bus. A data bus is coupled to each self-contained axle module and vehicle controller. Each self-contained axle module includes a first side plate removably coupled to the support structure. A second side plate removably coupled to the support structure. The housing coupled to the first and second side plates. An electric motor coupled to the housing and the principle power unit. A motor drive controller unit coupled to the electric motor and to the vehicle controller to communicate signals to the vehicle controller such that one of the speed and torque of the electric motor is controlled based upon the signals. A gear train is mounted in the housing and coupled to the electric motor and an output shaft. The first wheel end assembly is coupled to the housing in the output shaft and a second wheel end assembly is coupled to the housing and output shaft. Each self-contained axle module can be selectively coupled and decoupled from the support structure. Another embodiment of the vehicle includes a plurality of suspension assemblies wherein each suspension assembly independently suspends one of the wheel end assemblies relative to the vehicle support structure.

BRIEF DESCRIPTION OF THE DRAWINGS

FIG. 3 is a top view of an exemplary embodiment of a self-contained axle module including two wheel end assemblies.

FIG. 4 is a rear view of the self-contained axle module illustrated in FIG. 3.

FIG. 5 is a side view of the self-contained axle module illustrated in FIG. 3.

DETAILED DESCRIPTION OF THE EXEMPLARY EMBODIMENTS

Figure 1:
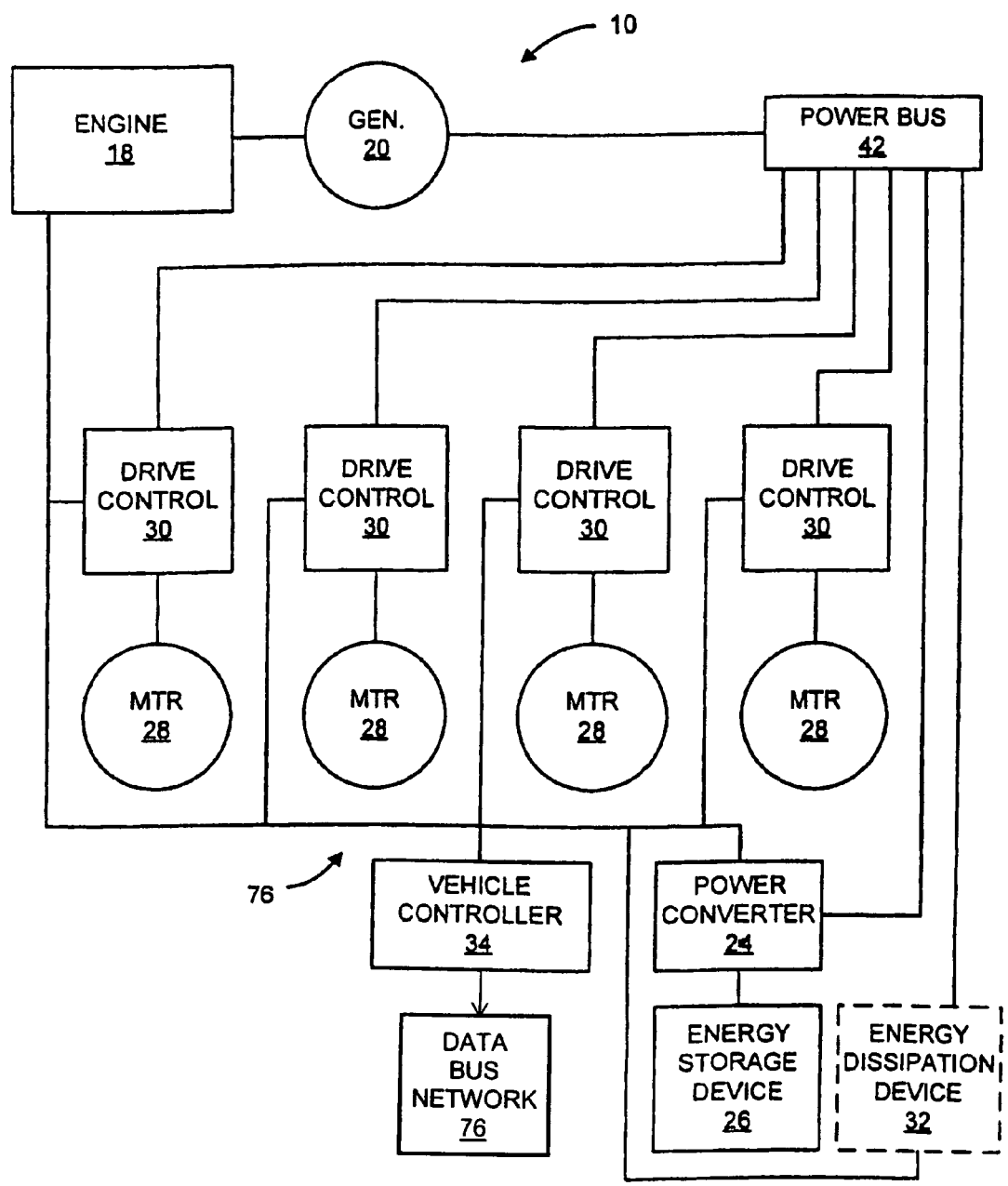
FIG. 1 is a schematic diagram of an electric vehicle according to an exemplary embodiment.

FIG. 1 is a schematic diagram of an electric vehicle 10 according to an exemplary embodiment. An electric vehicle is a vehicle that uses electricity in some form or another to provide all or part of the propulsion power of the vehicle. This electricity can come from a variety of sources, such as stored energy devices relying on chemical conversions (batteries), stored electrical charge devices (capacitors), stored energy devices relying on mechanical stored energy (e.g. flywheels, pressure accumulators), and energy conversion products. A hybrid electric vehicle is an electric vehicle that uses more than one sources of energy, such as one of the electrical energy storage devices mentioned above and another source, such as an internal combustion engine. By having more than one source of energy some optimizations in the design can allow for more efficient power production, thus one can use power from different sources to come up with a more efficient system for traction. The electric vehicle 10 can be used to implement electric vehicles in general and/or hybrid electric vehicles in particular. The electric vehicle 10 can implement a number of different vehicle types, such as a fire-fighting vehicle, military vehicle, snow blower vehicle, refuse handling vehicle, concrete mixing vehicle, etc.

In the illustrated embodiment, the electric vehicle 10 includes an engine 18, a generator 20, an electric power converter 24, an energy storage device 26, a plurality of electric motors 28, a plurality of drive controllers 30, a vehicle controller 34. Electric vehicle 10 optionally includes an energy dissipation unit 32. The generator 20, the drive controllers 30, and the electric power converter 24 are interconnected by a power bus 42, such as an AC or DC power bus. Electric vehicle 10 is generally configured to use a combination of the engine 18 and the generator 20 to provide braking capability and to dissipate excess electrical power generated by the electric motors 28 during regenerative braking.

The engine 18 is preferably an internal combustion engine, such as a diesel engine configured to both provide mechanical power to the generator 20 and to receive mechanical power from generator such that may function as a mechanical engine brake or air compressor. The generator 20 is coupled to the engine 18 and may be configured to function as both generator configured to provide AC or DC power, and as a motor configured to receive electrical power and provide mechanical power to the engine 18.

The electric power converter 24 is coupled to the energy storage device 26 and is configured to convert the electrical power generated by the generator 20, or by the electric motors 28 during regenerative braking, to the energy mode required by the energy storage device 26. For example, according to an exemplary embodiment, the electric power converter is configured to convert AC power generated by the generator 20 to DC power and transfer such converted power to the storage device 26. The electric power converter 24 may also convert the energy stored in the energy storage device 26 back to the energy mode of generator 20 to augment and supplement the power generated by generator 20 over the power bus 42. The energy storage device 26 may be electric capacitors, electrochemical capacitors or "ultracapacitors," storage batteries, a flywheel, or hydraulic accumulators.

The electric motors 28 are appropriately sized electric motors, which may be AC or DC electric motors. The electric motors 28 are configured to receive electrical power from the power bus 42 in order to provide a mechanical energy output to a wheel or axle. The electric motors 28 are also configured to receive mechanical energy from the wheel or axle during regenerative braking in order to generate electrical power onto the power bus 42.

The drive controllers 30 are coupled to each electric motor 28 and are configured to control the operation of each electric motor 28. More specifically, the drive controllers are configured to allow the electric motors 28 to either receive electrical power from the power bus 42 in order to provide a mechanical energy output to a wheel or axle, or to receive mechanical energy from the wheel or axle during regenerative braking in order to generate electrical power onto the power bus 42.

The vehicle controller 34 is coupled to the engine 18, the generator 20, the electric power converter 24, and the drive controllers 30 via a data bus network 76. The vehicle controller 34 is generally configured to control the operation of the engine 18, the generator 20, the electric power converter 24, the energy storage device 26, the plurality of electric motors 28, and the plurality of drive controllers 30. More specifically, the vehicle controller 34 is configured to assist in controlling the distribution of electrical power on the power bus so that the flow of electrical power from generator 20 and engine 18 may be reversed to provide braking capability, and so that excess electrical power generated by the electric motors 28 during regenerative braking is routed back to the generator 20 so that it may be dissipated through engine 18.

The optional energy dissipation unit 32 is typically a resistive element through which electrical power generated by the electric motors 28 during regenerative braking is dissipated as heat if the electrical power exceeds the capacity of the energy storage device 26. Preferably, electric vehicle 10 is configured such that the excess electrical power generated by the electric motors 28 during regenerative braking is sufficiently dissipated through engine 18 and generator 20.

In conventional vehicles and particularly in vehicles having a hybrid electric drive, it is often necessary to add support systems such as pressurized lubrication and supplemental cooling systems. Such systems typically are centrally mounted on the vehicle and require the routing of pressurized oil lines throughout the vehicle. The elimination of or limiting the number of such specialized conduit lines being routed through the vehicle, results in additional space for other components and truck parts. A self-contained axle module 50 for the vehicle 10, which includes a lubrication pump 70, the oil filter 72, and heat exchanger 82 at the axle and integrating such components into a self-contained axle module minimizes the conduit routings mentioned above.

A self-contained axle module 50 can be mounted or coupled to the vehicle 10 support structure 12 at any convenient position determined by the manufacturer or user of the vehicle 10. Also, because of the modular configuration, a self-contained axle module 50 can be easily removed and replaced for maintenance or repairs. The self-contained axle module 50 only has to be coupled to the source for electrical power such as the principal power unit and generator 18, 20 and the electric AC power bus 42. It should be understood that other sources of power, as described above, can be coupled to the self-contained axle module 50 to provide the necessary electrical power to operate the electric motor 28, as described below. In addition to coupling electric power to the self-contained axle module 50, a control signal, through a data bus 76 network provides the necessary control and feedback signals for operation of the axle. It is also contemplated that supplemental cooling may be required because of the environment or operating conditions of the self-contained axle module 50 and therefore supplemental cooling source can also be coupled to the axle.

The self-contained axle module 50 includes a first side plate 52 removably coupled to the support structure 12 of the vehicle 10. The second side plate 54 is removably coupled to the support structure 12. A housing 56 is coupled to the first and second side plates 52, 54. (See FIGS. 3-5.) The side plates can be composed of any suitable material, such as steel, and formed by any convenient and conventional method. The side plates 52, 54 are removably coupled to the support structure 12 of the vehicle 10 by bolts, however other means of coupling can be utilized as determined by the user. The positioning of the side plates 52, 54 along the vehicle support structure 12 is determined by the intended use and operation of the vehicle 10.

The housing 56 can be composed of any suitable material, such as iron, steel, or aluminum and can be cast and machined as designed by the manufacturer. The housing 56 includes a sump portion in the lowest area of the housing 56. The housing 56 in addition to the components described below also houses a gear train which transmits force from the electric motor 28 to the output shaft 60. The gear train may include several types of gears such as planetary gears, sprocket gears, bevel gears or the like with selected gear ratios as determined by the manufacturer and operator of the vehicle 10.

An electric motor 28 is coupled to the housing 56 and to the source for electric power. As described above, the source for electric power can be the engine/generator 18, 20, with the power routed through the power bus 42. It should also be understood that the source of power can be the energy storage device 26 as routed through the power converter 24 and the power bus 42. Control of the power routing is provided through the vehicle controller 34 over the data bus network 76.

A motor drive control unit 30 is coupled to the electric motor 28 and to the vehicle control device 34 to communicate signals to the vehicle control device 34 such that one of the speed and torque of the electric motor 28 is controlled based upon the signals. The motor drive controller 30 working in conjunction with the vehicle control device 34 can operate at preset parameters or in response to inputs from an operator typically situated in the cab of the vehicle 10. However, it should be understood that control of the vehicle can be established and maintained outside of the vehicle 10 with a tethered control unit remotely by use of radio frequency signals, infrared signals, or the like.

Figure 2:
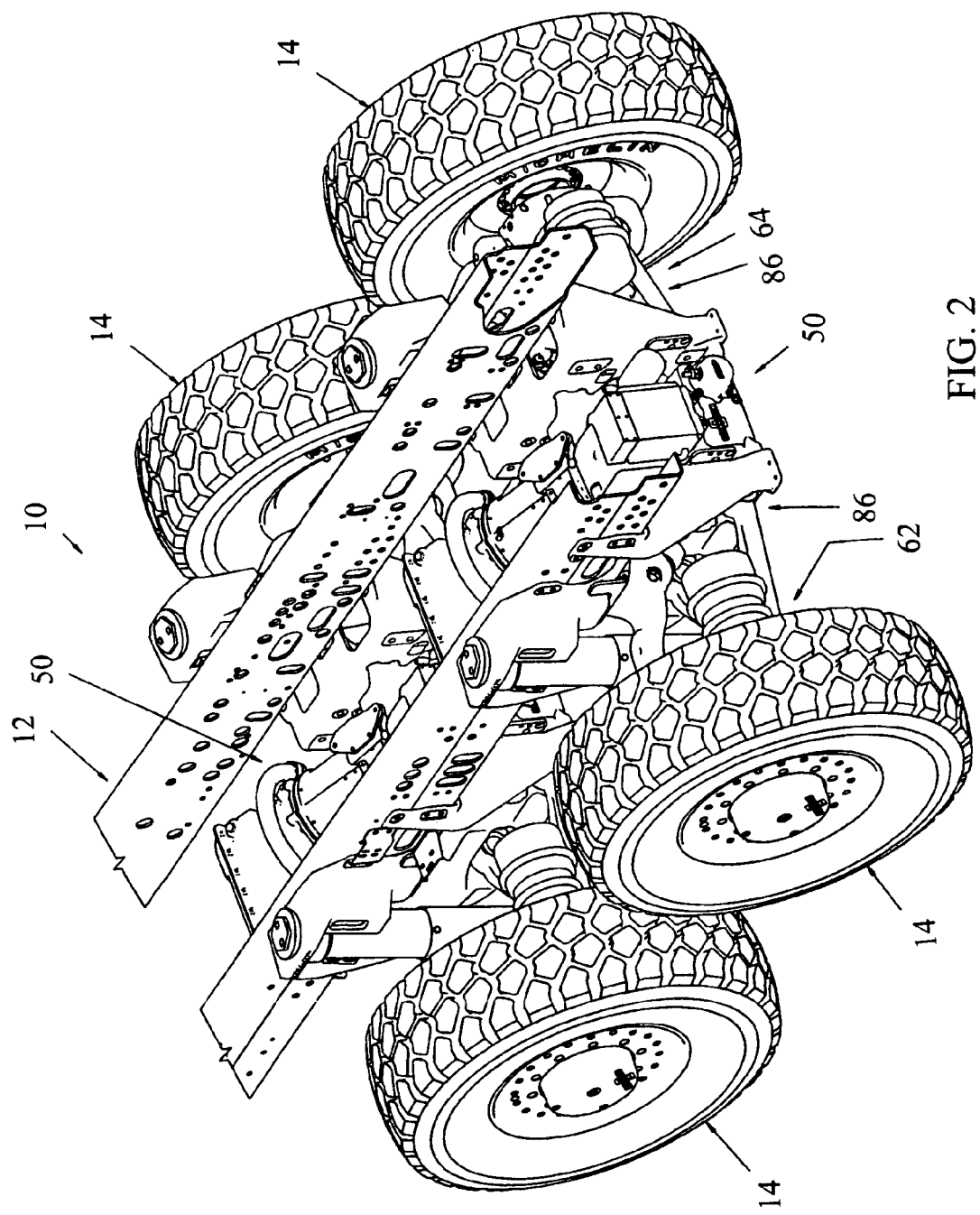
FIG. 2 is a partial perspective view of an exemplary embodiment of a vehicle including a self-contained axle module coupled to a vehicle support structure of the vehicle.

The self-contained axle module 50 can be selectively coupled and decoupled from the support structure 12 as determined by the operator of the vehicle 10. It should also be understood that the self-contained axle module 50 can be mounted as illustrated in FIG. 2 wherein two separate self-contained axle modules 50 are mounted to the vehicle support structure 12 in a tandem arrangement. However, one or both of the illustrated self-contained axle modules 50 can be rotated 180° relative to the vehicle support structure 12 as such configuration is convenient or appropriate for the intended use of the vehicle 10. It should also be understood that one more or one less self-contained axle module 50 can be coupled or decoupled from the vehicle support structure 12 as determined by the user or manufacturer of the vehicle 10.

A self-contained axle module 50 may also include a first wheel end assembly 62 coupled to the housing 56 and the output shaft 60. A second wheel end assembly 64 can be coupled to the housing 56 and the output shaft 60. The wheel end assemblies 62, 64 can include a wheel, a tire, a wheel brake, and a multiple input drive unit brake. Wheel end assembly receives as inputs rotational mechanical energy from the output shaft 60. The wheel end assemblies may also be coupled to a track, for example, on a bulldozer.

Figure 6:
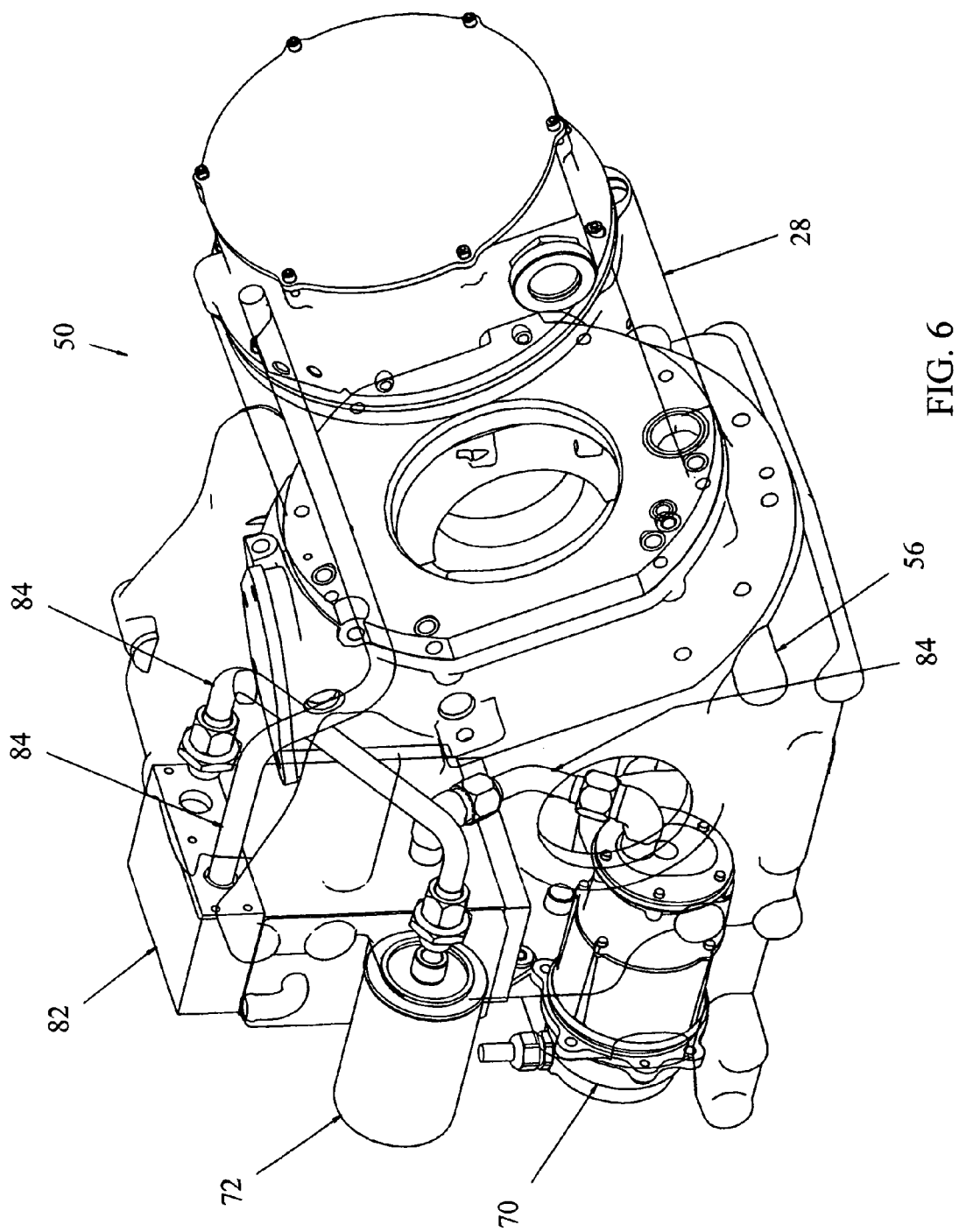
FIG. 6 is a perspective view of an exemplary embodiment of a housing and electric motor of a self-contained axle module and illustrating an oil pump mounted in the sump of the housing, an oil filter mounted on the housing, a heat exchanger mounted on the housing and the conduit connections between such devices for cooling and heating oil in the axle module.

A self-contained axle module 50 can also include an oil pump 70 mounted inside the housing 56. The oil pump 70 and its associated motor is configured to be immersed in oil contained in the sump portion of the housing 56. (See FIG. 6.) An oil filter 72 is also mounted on the housing and fluidly coupled to the oil pump 70. The heat exchanger 82 can also be mounted on the housing 56 and configured to provide cooling for the interior of the housing 56, with the heat exchanger 82 fluidly coupled to the oil filter 72 and oil pump 70. The heat exchanger 82 may also be coupled to the source of cooling medium which may be the oil in the sump portion of the housing 56 or a supplemental cooling source mounted on the support structure 12 of the vehicle 10 with the oil pump submersed in the oil in the housing 56. The oil pump 70 may also be used to preheat the oil and axle components. Preheating of the oil and the axle components reduces the stress on the components particularly in cool or cold environments. By mounting the oil cooling and pumping components directly onto the housing 56 of the self-contained axle module 50, high pressure oil lines routed through the truck are not necessary thereby providing cost reductions and operational efficiency to the system.

The self-contained axle module 50 may also include a skid plate 80 coupled to the first and second side plates 52, 54 and configured to protect the underside portion of the housing 56 (See FIGS. 3-5.).

The self-contained axle module 50 may also include a power take-off (PTO) apparatus 74 mounted on the housing 56 and coupled to the gear train and a tool (See FIGS. 3 and 4.). The PTO can be used to drive the tool, such as a pump to power other equipment associated with the vehicle 10. The PTO can be configured to operate at a speed independent of wheel 14 speed of the vehicle 10 and dependent on the electric motor 28 speed or the PTO can be configured to operate at a speed related to both electric motor 28 speed and wheel 14 speed. The electric motor 28 provides power to the PTO through an associated gear train and can be coupled or uncoupled to the output shaft 60 of the self-contained axle module 50.

It is also contemplated that the vehicle 10 may also include a plurality of independent suspension assemblies 86 which independently suspends one of the wheel end assemblies relative to the vehicle support structure.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature The foregoing description of embodiments has been presented for purposes of illustration and description. It is not intended to be exhaustive or to be limited to the precise forms disclosed, and modifications and variations are possible in light of the above teachings. The embodiments were chosen and described in order to explain the principles of the self-contained axle module and its practical application to enable one skilled in the art to utilize the various embodiments and with various modifications as are suited to the particular use contemplated. It is intended that the scope of the self-contained axle module be defined by the claims appended hereto and their equivalents.

What is claimed is:

1. A self-contained axle module with independent suspension for a vehicle, with the vehicle including a support structure, a source for electrical power, a source of cooling medium, and a vehicle control device, the self-contained axle module comprising:
    a first side plate removably coupled to the support structure;
    a second side plate removably coupled to the support structure;
    a housing coupled to the first and second side plate;
    an output shaft projecting externally from opposite sides of the housing;
    an electric motor coupled to the housing and the source for electric power, and operable to rotate the output shaft;
    a motor drive controller unit coupled to the electric motor and to the vehicle control device to communicate signals to the vehicle control device such that one of the speed and torque of the electric motor is controlled based upon the signals;
    a first wheel end assembly coupled to the output shaft;
    a second wheel end assembly coupled to the output shaft;
    a first independent suspension assembly coupled to the first wheel end assembly and the first side plate to permit movement of the first wheel end assembly independent of the housing and the second wheel end assembly;
    a second independent suspension assembly coupled to the second wheel end assembly and the second side plate to permit movement of the second wheel end assembly independent of the housing and the first wheel end assembly;
    wherein, the first and second independent suspension assemblies and the first and second wheel end assemblies and the housing are removable from the support structure as a unit by removing the first and second side plates from the support structure.

2. The self-contained axle module of claim 1, wherein the electric motor is mounted on the housing at an angle, relative to the plane of the support structure, other than 90 degrees.

3. The self-contained axle module of claim 2, wherein the angle is between 20 degrees and 30 degrees.

4. The self-contained axle module of claim 1, including a skid plate coupled to the first and second side plates and configured to protect the underside portion of the housing.

5. The self-contained axle module of claim 1, including a heat exchanger mounted on the housing and configure to provide cooling for the interior of the housing, with the heat exchanger coupled to the source of cooling medium.

6. A vehicle comprising:
    a vehicle support structure;
    a principal power unit supported by the vehicle support structure;
    an electric AC power bus including at least two phase conductors, wherein the phase conductors are coupled to the principal power unit;
    a power storage unit coupled to the AC power bus;
    at least one self-contained axle module coupled to the vehicle support structure;
    a vehicle controller coupled to each self-contained axle module and the AC power bus; and
    a data bus coupled to each self-contained axle module and vehicle controller;
    wherein each self-contained axle comprises:
    a housing removably coupled to the support structure;
    an output shaft having a first half extending outwardly from the housing, and a second half extending outwardly from the housing;
    an electric motor coupled to the housing and the principal power unit and operable to drive the output shaft;
    a motor drive controller unit coupled to the electric motor and to the vehicle controller to communicate signals to the vehicle controller such that one of the speed and torque of the electric motor is controlled base upon the signals;
    a first wheel end assembly coupled to the housing and the output shaft;
    a second wheel end assembly coupled to the housing and the output shaft;
    a first suspension assembly independently suspending the first wheel end assembly relative to the housing;
    a second suspension assembly independently suspending the second wheel end assembly relative to the housing;
    wherein the first and second suspension assemblies and the first and second wheel end assemblies and the housing are removable as a unit by removing the housing from the vehicle support structure.

7. The vehicle of claim 6, wherein the electric motor is mounted on the housing at an angle, relative to the plane of the support structure, other than 90 degrees.

8. The vehicle of claim 7, wherein the angle is between 20 degrees and 30 degrees.

9. The vehicle of claim 6, including a skid plate coupled to the first and second side plates and configured to protect the underside portion of the housing.

10. The vehicle of claim 6, including a heat exchanger mounted on the housing and configure to provide cooling for the interior of the housing, with the heat exchanger coupled to the a source of cooling medium.

11. The vehicle of claim 6, wherein the self-contained axle module is removably attachable to the vehicle support structure at any one of a plurality of locations along the vehicle support structure.

12. The vehicle of claim 6, wherein the vehicle controller is configured to control the electric motor to brake the vehicle.

13. The vehicle of claim 6, wherein the electric motor is configured to regenerate power back to one of the principal power unit and the power storage unit.

14. A self-contained and interchangeable axle module for use with an independent suspension type vehicle, the vehicle having a support structure, the axle module comprising:
    a housing having a first side removably attachable to the support structure at any one of a plurality of locations along the support structure, and a second side removably attachable to the support structure at any one of a plurality of locations along the support structure;
    an output shaft having a first segment extending outwardly from the first side of the housing, and a second segment extending outwardly from the second side of the housing;
    at least one electric motor coupled to the housing and operable to drive the first segment and the second segment of the output shaft;
    a first wheel end assembly coupled to an outward end of the first segment of the output shaft;
    a second wheel end assembly coupled to an outward end of the second segment of the output shaft;

a first independent suspension assembly coupled to the first wheel end assembly and the housing and operable for movement of the first wheel end assembly independent of the housing and the second wheel end assembly; and a second independent suspension assembly coupled to the second wheel end assembly and the housing and operable for movement of the second wheel end assembly independent of the housing and the first wheel end assembly wherein the first and second independent suspension assemblies and the first and second wheel end assemblies are removable from the vehicle as a unit by detaching the first side and the second side of the housing from the support structure.

\* \* \* \* \*